United States Patent [19]

Graves et al.

[11] Patent Number: 5,057,869
[45] Date of Patent: Oct. 15, 1991

[54] SYSTEM FOR SCANNING SIGNATURE PAGES

[75] Inventors: James R. Graves, Ontario; Gerald L. Coy, Rochester; William A. Blitz, Webster; David E. Crocker, Fairport, all of N.Y.

[73] Assignee: Xerox Corporation, Stamford, Conn.

[21] Appl. No.: 620,519

[22] Filed: Nov. 30, 1990

[51] Int. Cl.[5] ............................................. G03G 15/28
[52] U.S. Cl. ..................................... 355/233; 283/117; 355/218
[58] Field of Search ............... 355/234, 235, 308, 309, 355/218, 233, 311, 244, 317, 321, 25; 271/3.1, 9; 283/117

[56] References Cited

U.S. PATENT DOCUMENTS

| | | | |
|---|---|---|---|
| 4,277,163 | 7/1981 | Ikesue et al. | 355/243 |
| 4,353,638 | 10/1982 | Knechtel | 355/233 |
| 4,371,255 | 2/1983 | Satomi | 355/218 X |
| 4,607,946 | 8/1986 | Uchiyama et al. | 355/311 |
| 4,659,207 | 4/1987 | Maekawa | 355/233 X |
| 4,696,563 | 9/1987 | Shibusawa | 355/311 |
| 4,702,589 | 10/1987 | Ito | 355/311 X |
| 4,819,029 | 4/1989 | Ito | 355/311 X |
| 4,855,786 | 8/1989 | Ohira et al. | 355/218 |
| 4,901,112 | 2/1990 | Araki | 355/218 X |

FOREIGN PATENT DOCUMENTS 62-47264  2/1987  Japan .

Primary Examiner—A. T. Grimley
Assistant Examiner—William J. Royer
Attorney, Agent, or Firm—Frederick E. McMullen

[57] ABSTRACT

An electronic printing system for scanning signature pages for signature jobs in which the pages of the document are placed face down in registered position on the platen of a scanner such that the signature images are side by side in the fast scan direction in order to enable an array to view both images concurrently on relative movement between the array and the platen in a slow scan direction.

4 Claims, 13 Drawing Sheets

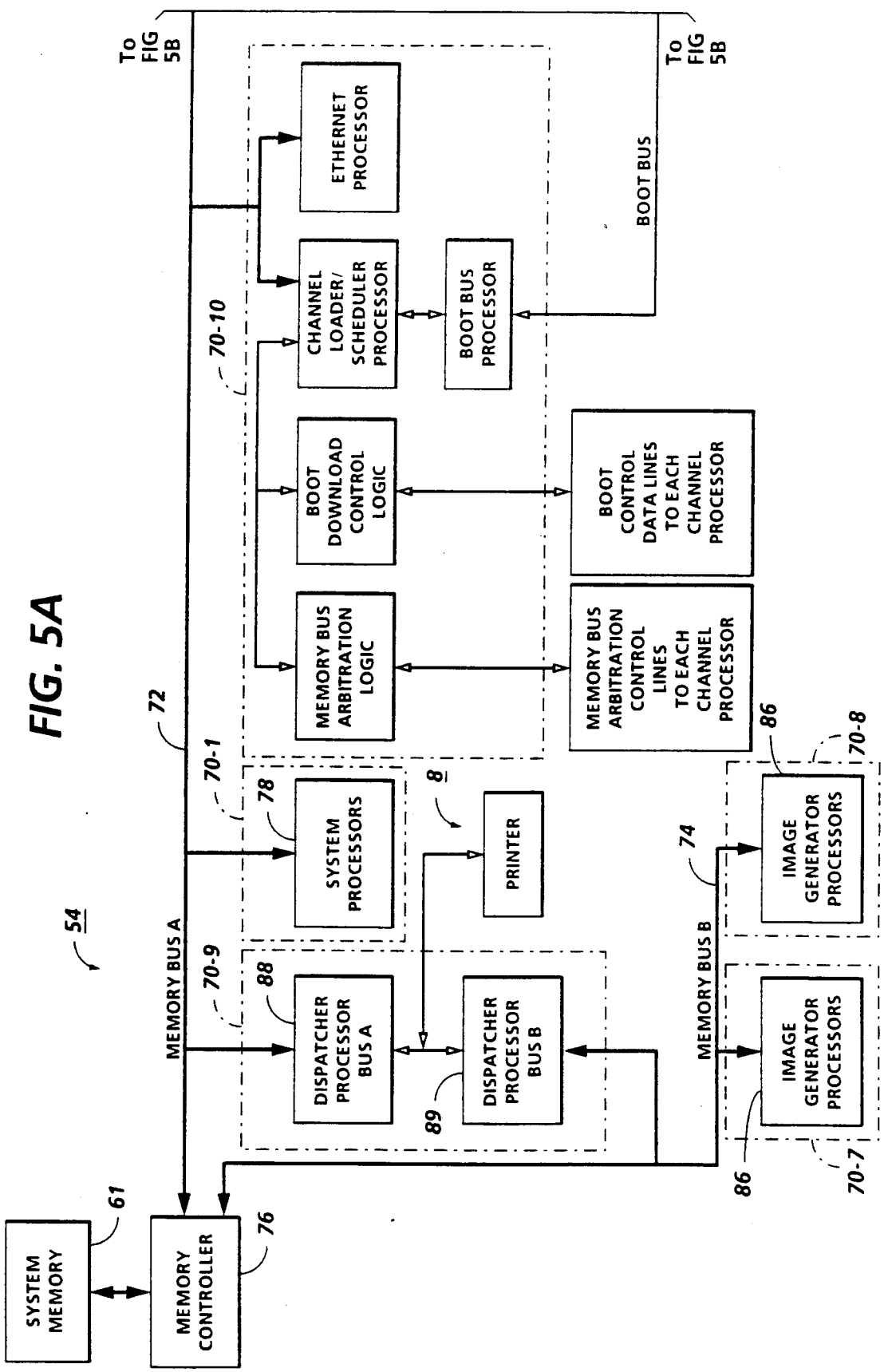

FIG. 11

SYSTEM FOR SCANNING SIGNATURE PAGES

The invention relates to electronic printers and printing systems, and more particularly, to a system for scanning signature documents for printing.

Future electronic printers and printing systems are intended to provide the operator or user with as many job programming options and selections as reasonably possible. One desired option answers the need that sometimes makes it necessary or desirable to make copies or prints of signature documents which are often in the form of bound documents such as books. As can be understood, signature documents can be difficult to process since there are two images instead of the normal one on the document to be scanned. As a result, programming a signature job is normally more complex since the programming choices such as image margins, image size, etc. are effectively doubled. Further, in signature jobs, an added complexity is created because of the need to program the system to create a non-image area referred to as a gutter between the two images on the document to avoid obscuring parts of the signature images when the signatures are later folded.

In the prior art, U.S. Pat. No. 4,277,163 to Ikesue et al discloses a variable magnification electrostatic copying machine in which vertical and horizontal lengths of an original are automatically sensed and compared with vertical and horizontal lengths of a copy sheet to adjust magnification to the size of the copy sheets. U.S. Pat. No. 4,607,946 to Uchiyama et al is similar in that Uchiyama et al discloses sensing of the size of the document such as a signature document on the platen and comparing the size of the document sensed with the size of the copy sheets. U.S. Pat. No. 4,659,207 to Maekawa discloses a system for independently scanning two parts of an original document consisting of a first half side and a second half side and copying the scanned images onto two separate pages or onto the front and back sides of a page, with the pages split in the direction of carriage motion. U.S. Pat. No. 4,696,563 to Shibusawa discloses a split scanning copier which divides an original such as a book into two surface sections based on information supplied from a size detector. And U.S. Pat. No. 4,702,589 to Ito discloses a copying machine that copies halves of a document onto different recording medium surfaces while U.S. Pat. No. 4,819,029 to Ito discloses a light/lens type copier enabling a margin to be provided on the copy by shifting the position of the image transferred to the photoreceptor slightly.

In contrast, the present invention provides a process for scanning signature documents in which each signature document has two discrete images separated by a gutter, with a scanner having a platen for supporting documents for scanning and at least one scanning array movable relative to the platen and the document thereon in the slow scan direction, the array scanning the document on the platen line by line in the fast scan direction to convert the images scanned to image signals, comprising the steps of: positioning the signature document on the platen for scanning with the document oriented so that the two images are side by side one another in the fast scan direction to enable the array to view both the images concurrently on relative movement between the array and the platen in the slow scan direction; setting the inside margins of the images in the fast scan direction to provide the gutter; setting the outside margins of the images in the fast scan direction to establish in cooperation with the inside margins the size of the images in the fast scan direction; actuating the scanner to move the array relative to the platen in one scan direction to scan the image area of the signature document delineated by one of the inside and outside margin pair whereby to provide image signals representative of one image; reversing the scan direction to scan the area of the signature document delineated by the other of the inside and outside margin pair whereby to provide image signals representative of the other image.

IN THE DRAWINGS

Figure 1:
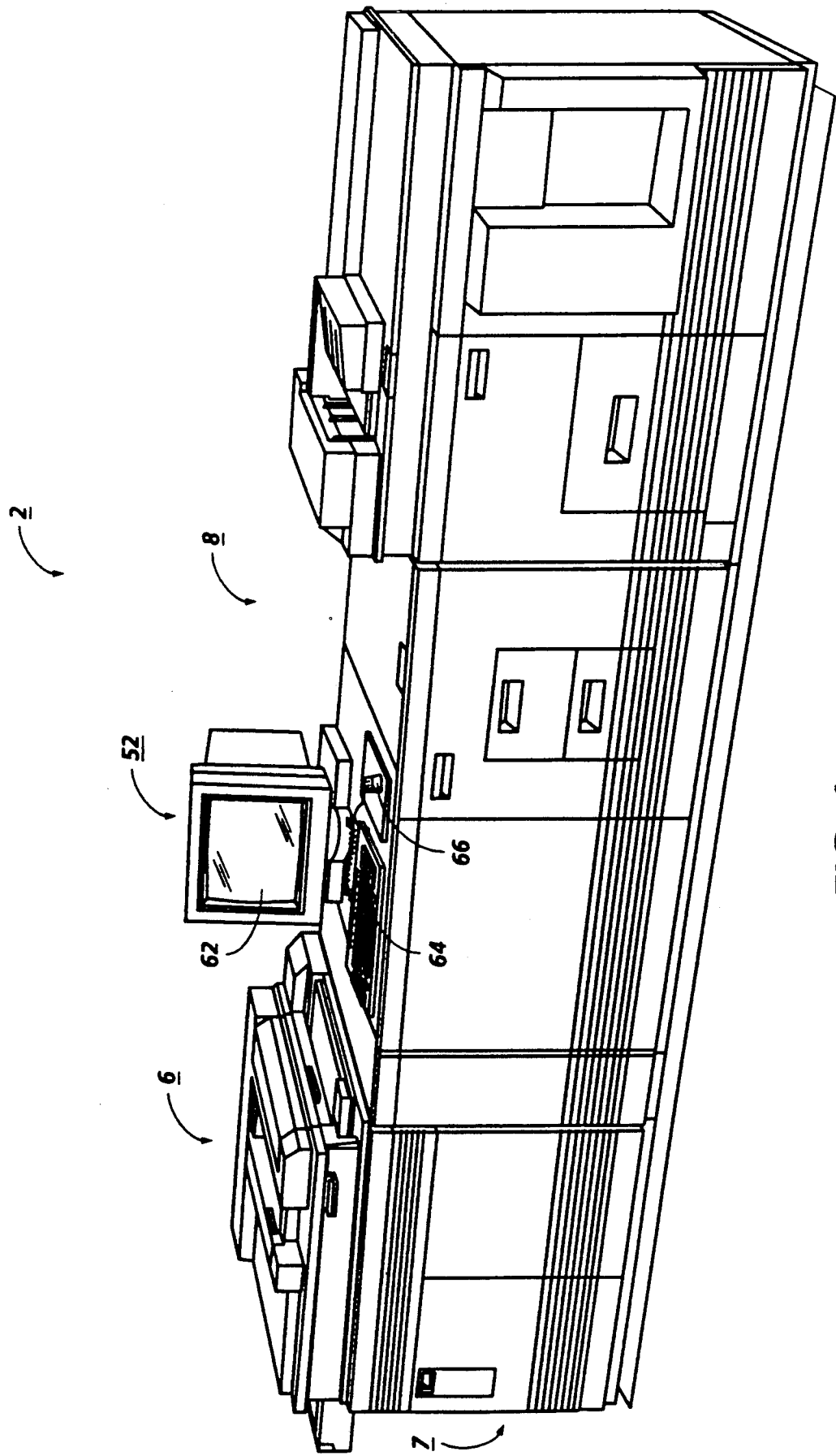
FIG. 1 is a view depicting an electronic printing system of the type adapted to employ the signature page scanning system of the present invention.
Figure 5B:
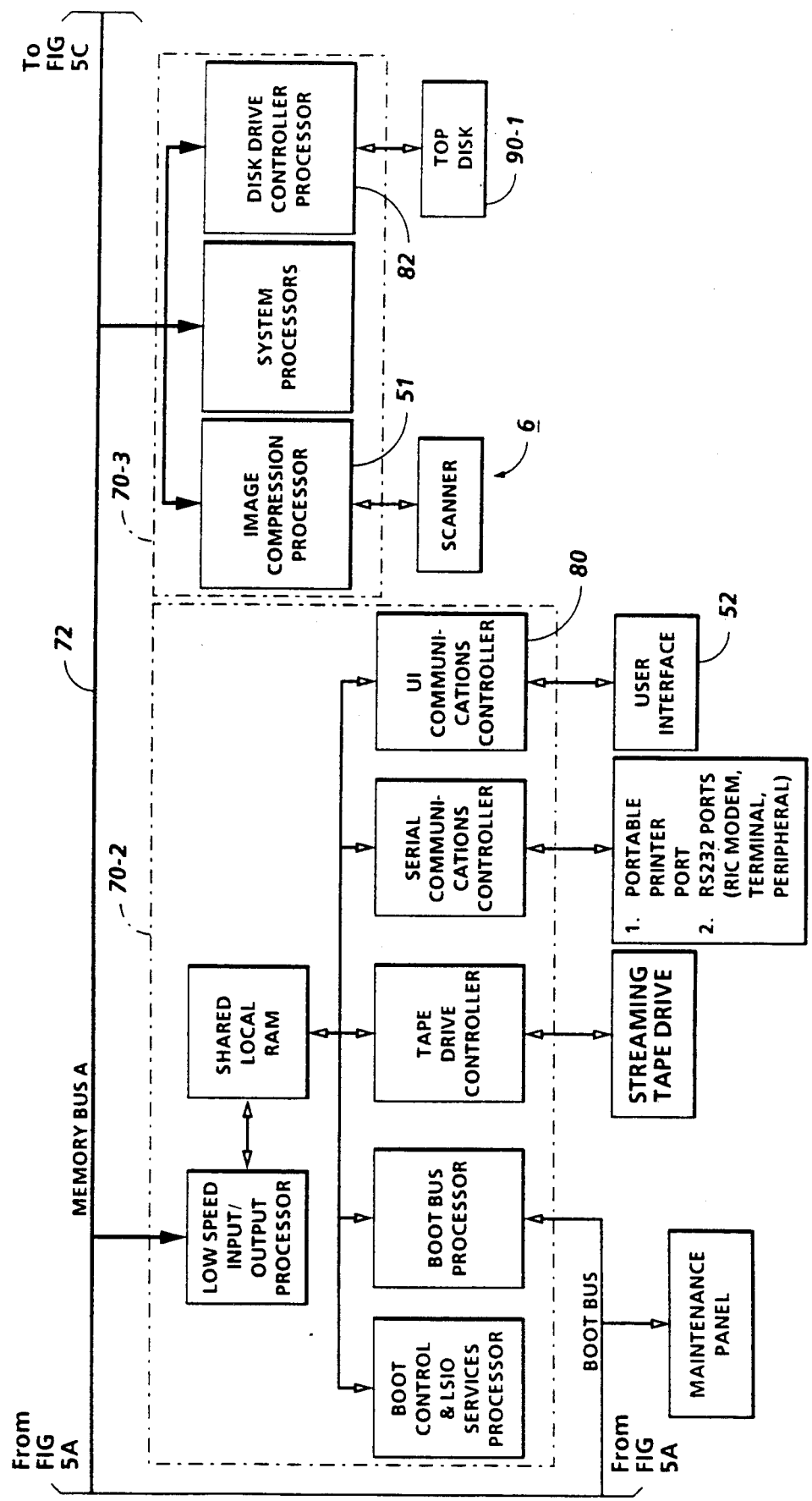
Figure 5C:
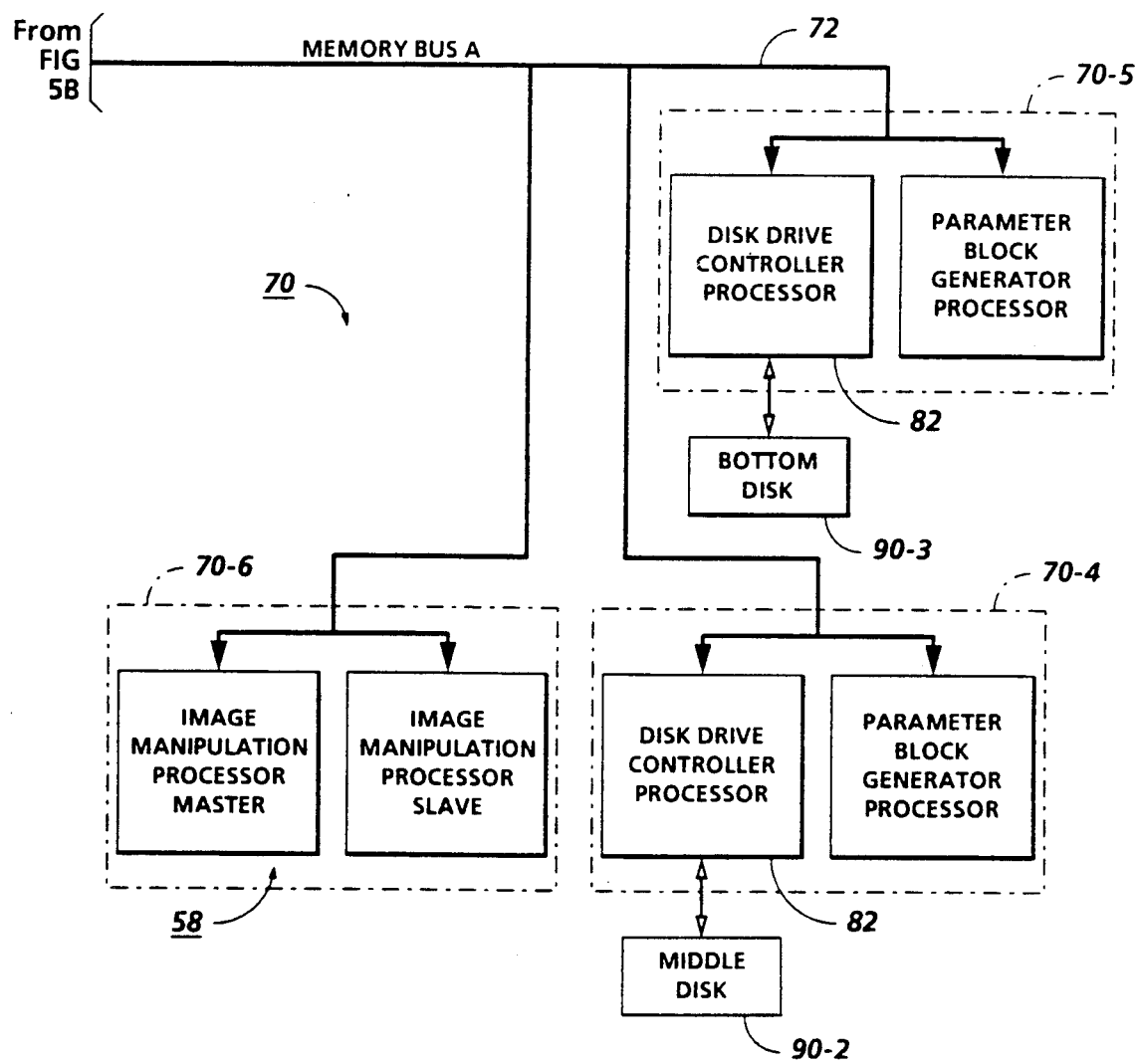
Figure 6:
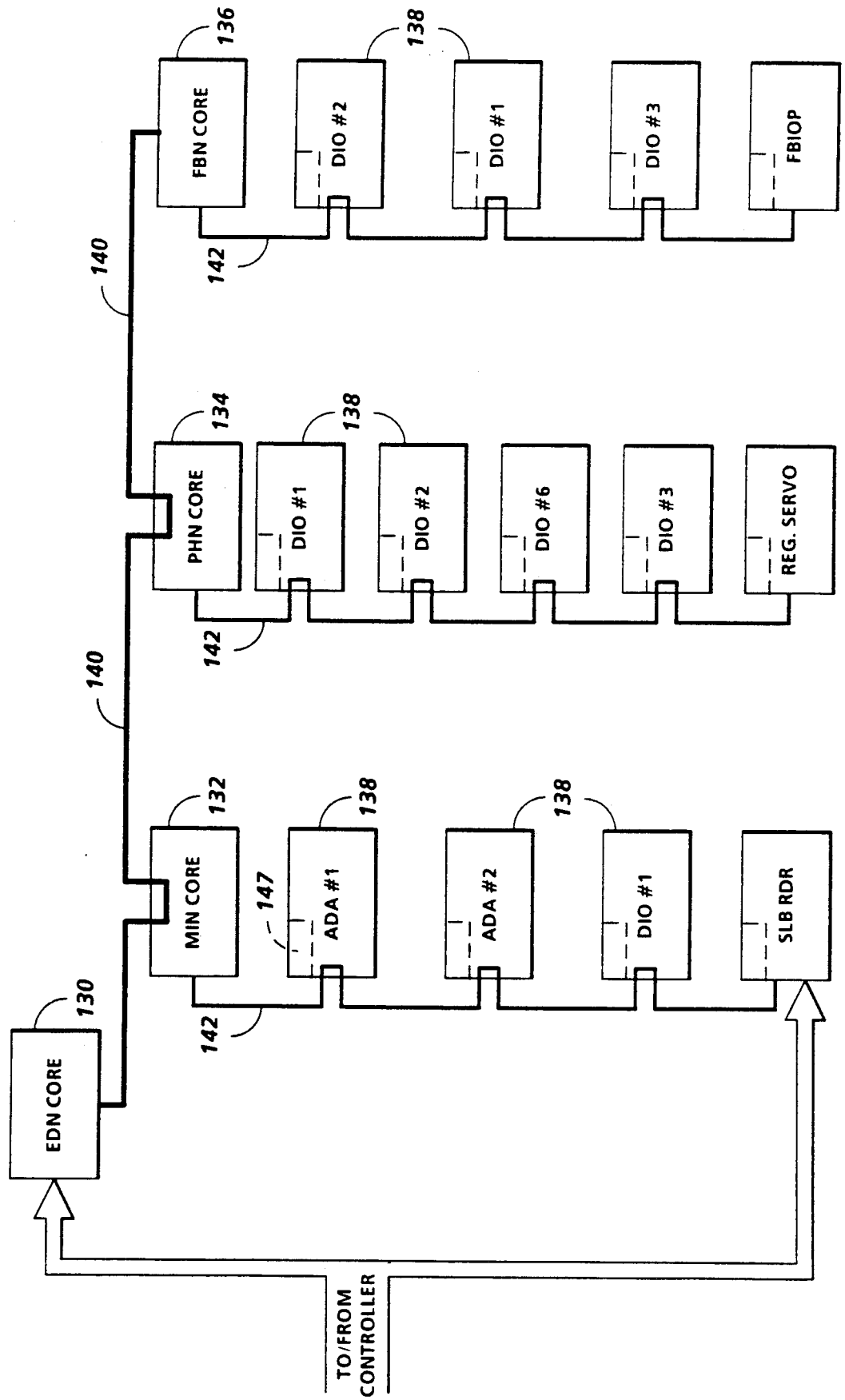
Figure 7:
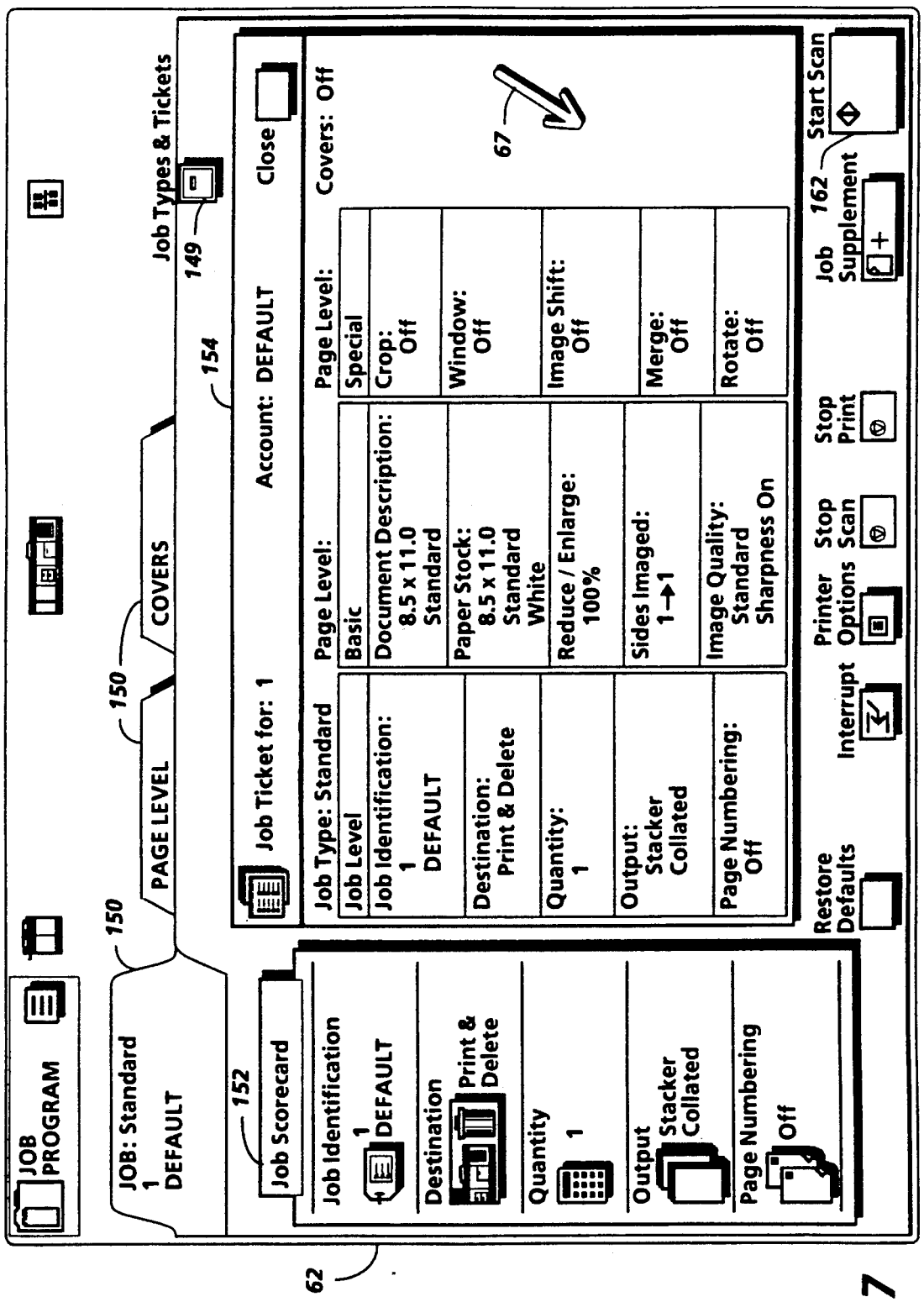
Figure 8:
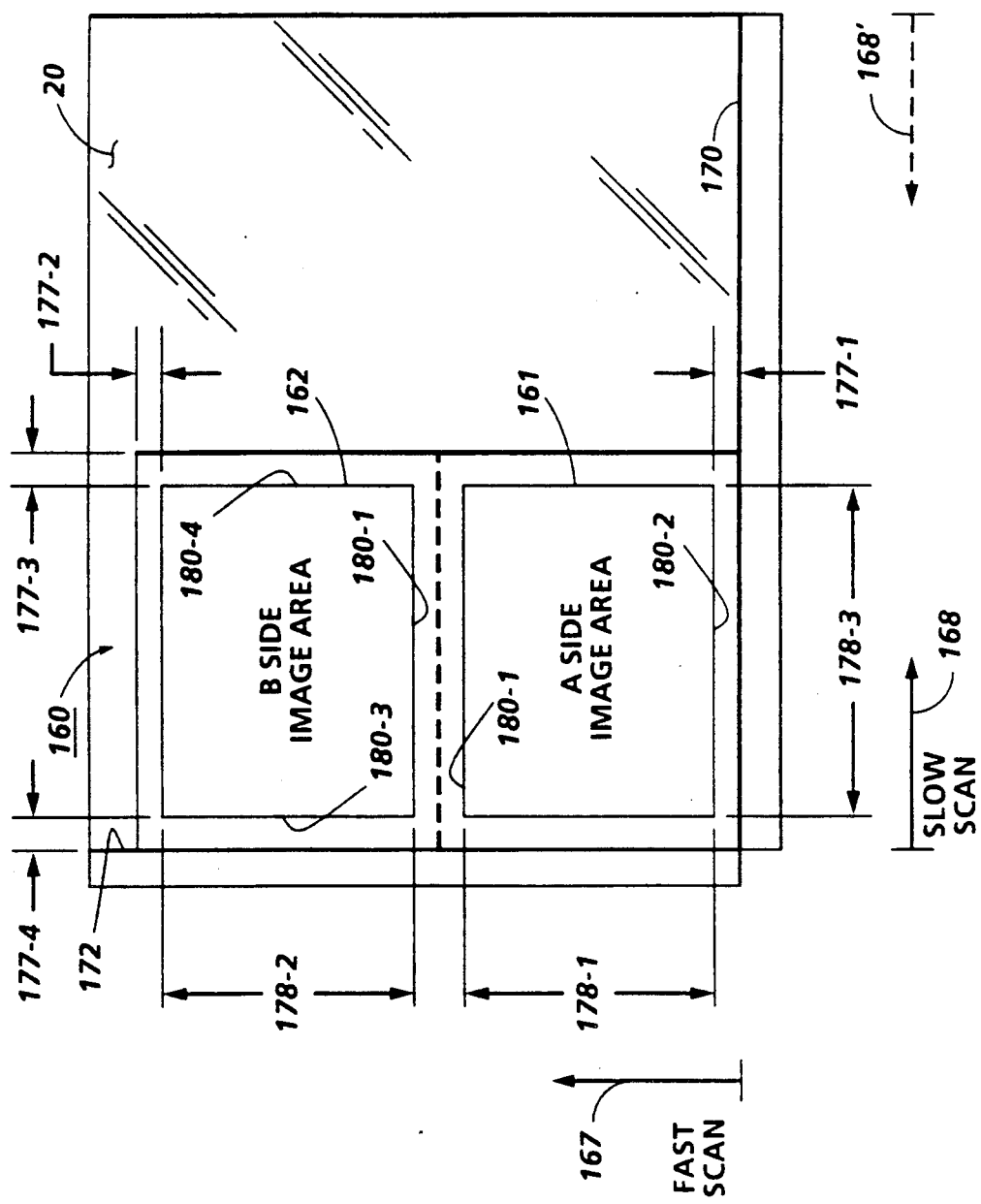
Figure 9:
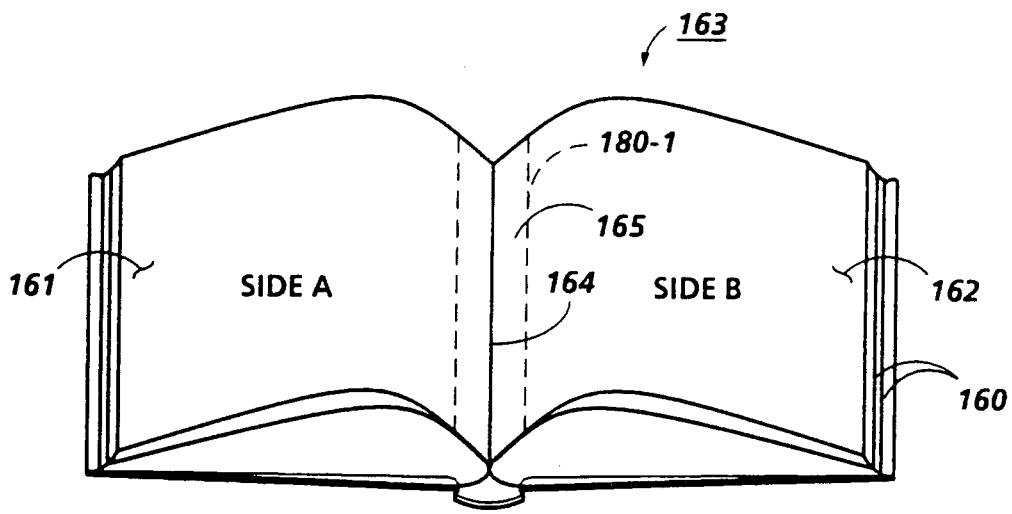
Figure 10:
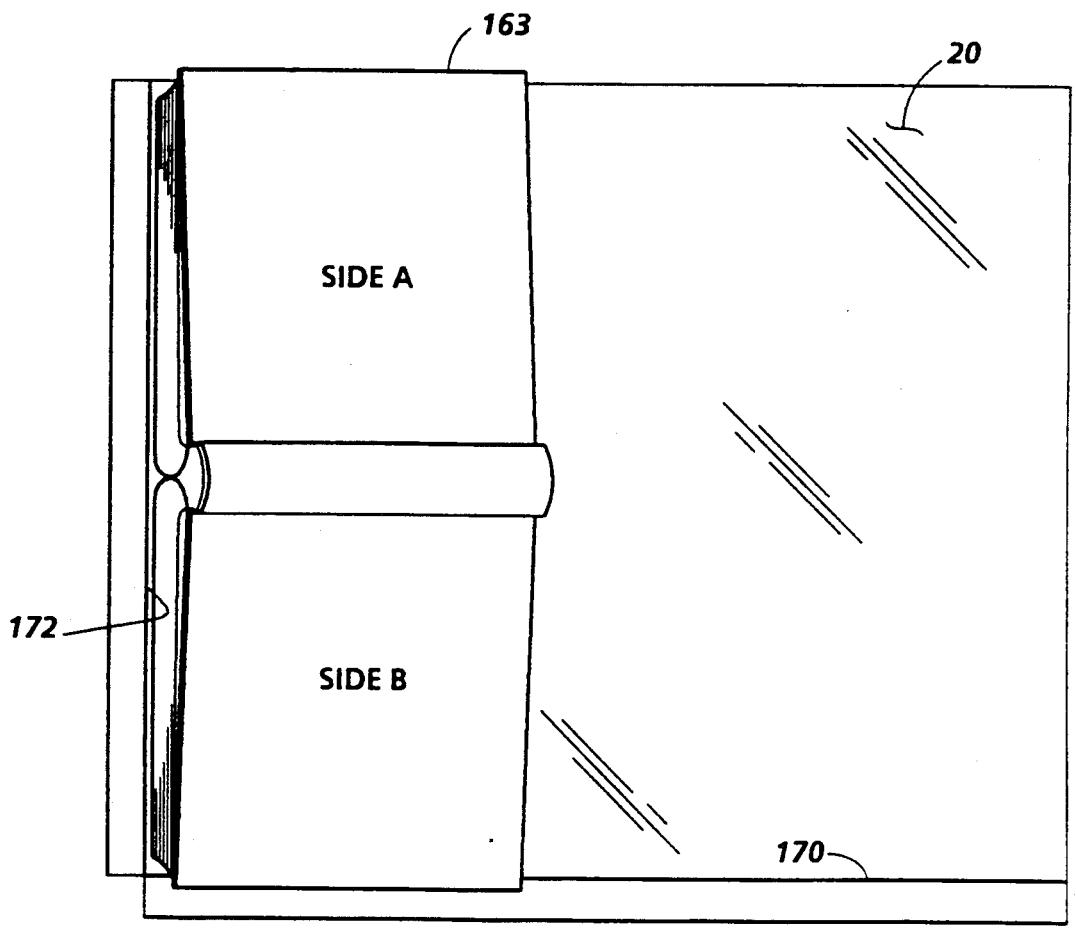
Figure 12:
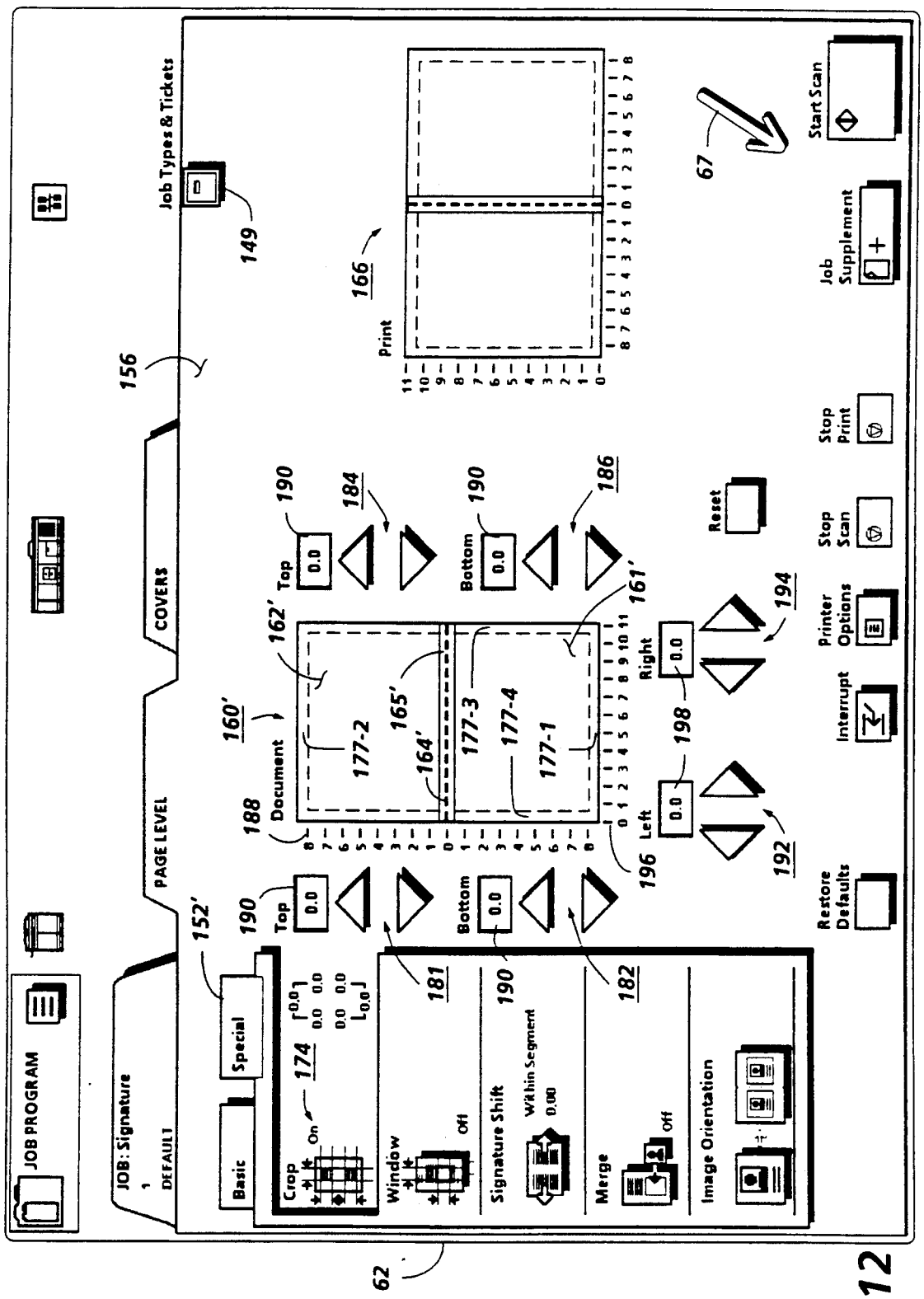

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view from the underside of the scanner platen depicting a signature document in registered position on the platen for scanning with crop offset and crop distance areas shown;

FIG. 9 is a view illustrating a reader's view of an opened bound document;

FIG. 10 is a view illustrating the bound document shown in FIG. 9 oriented on the platen so that the images are side by side in the fast scan direction in accordance with the invention;

Figure 11:
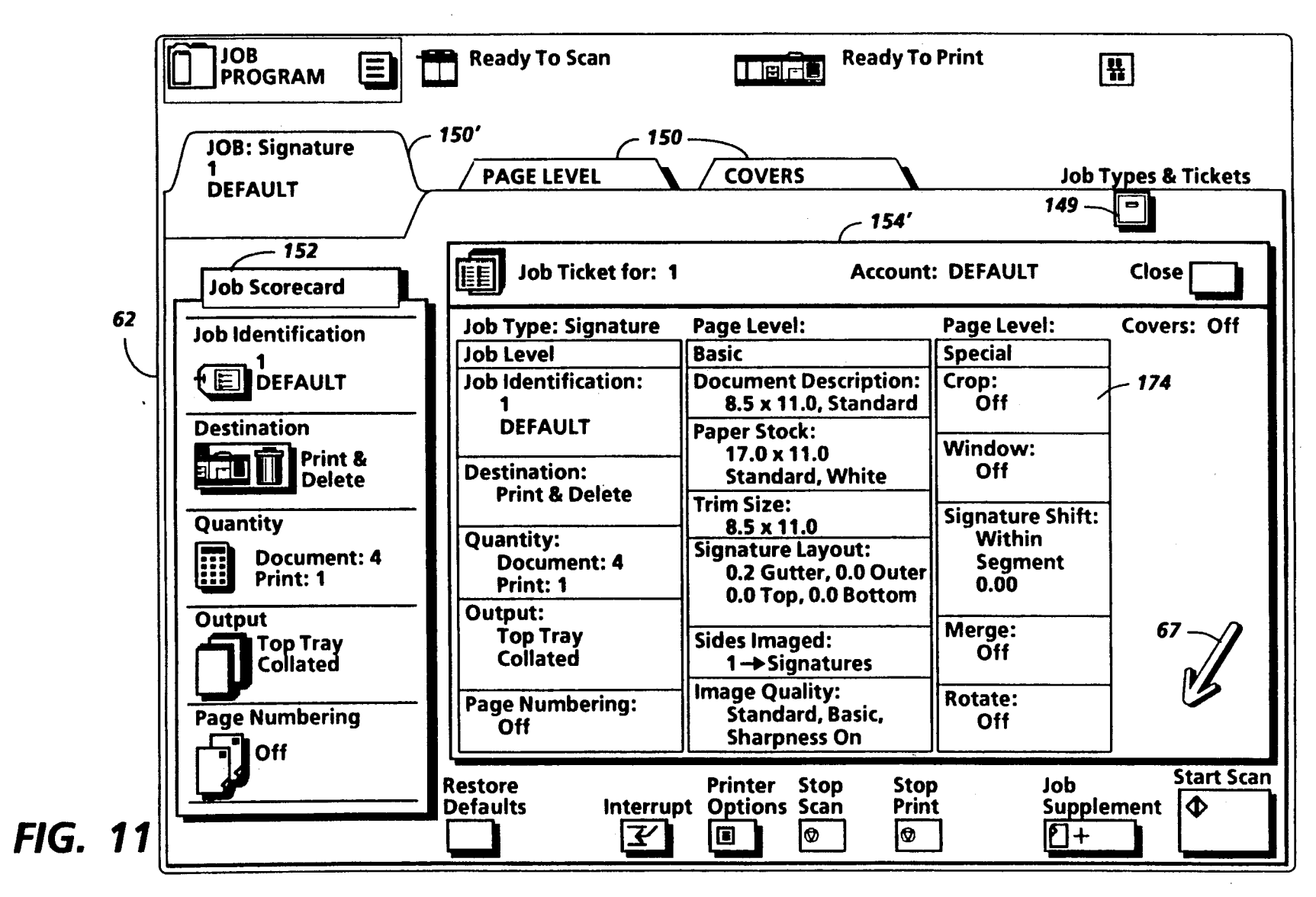

FIG. 11 is a view of the UI touchscreen display depicting a "Signature" Job Ticket and "Job Scorecard" for use in programming a signature job; and FIG. 12 is a view of the touchscreen display following highlighting of the "Crop" selection showing various programming selections for setting the crop offset and crop distances for scanning signature documents.

Figure 2:
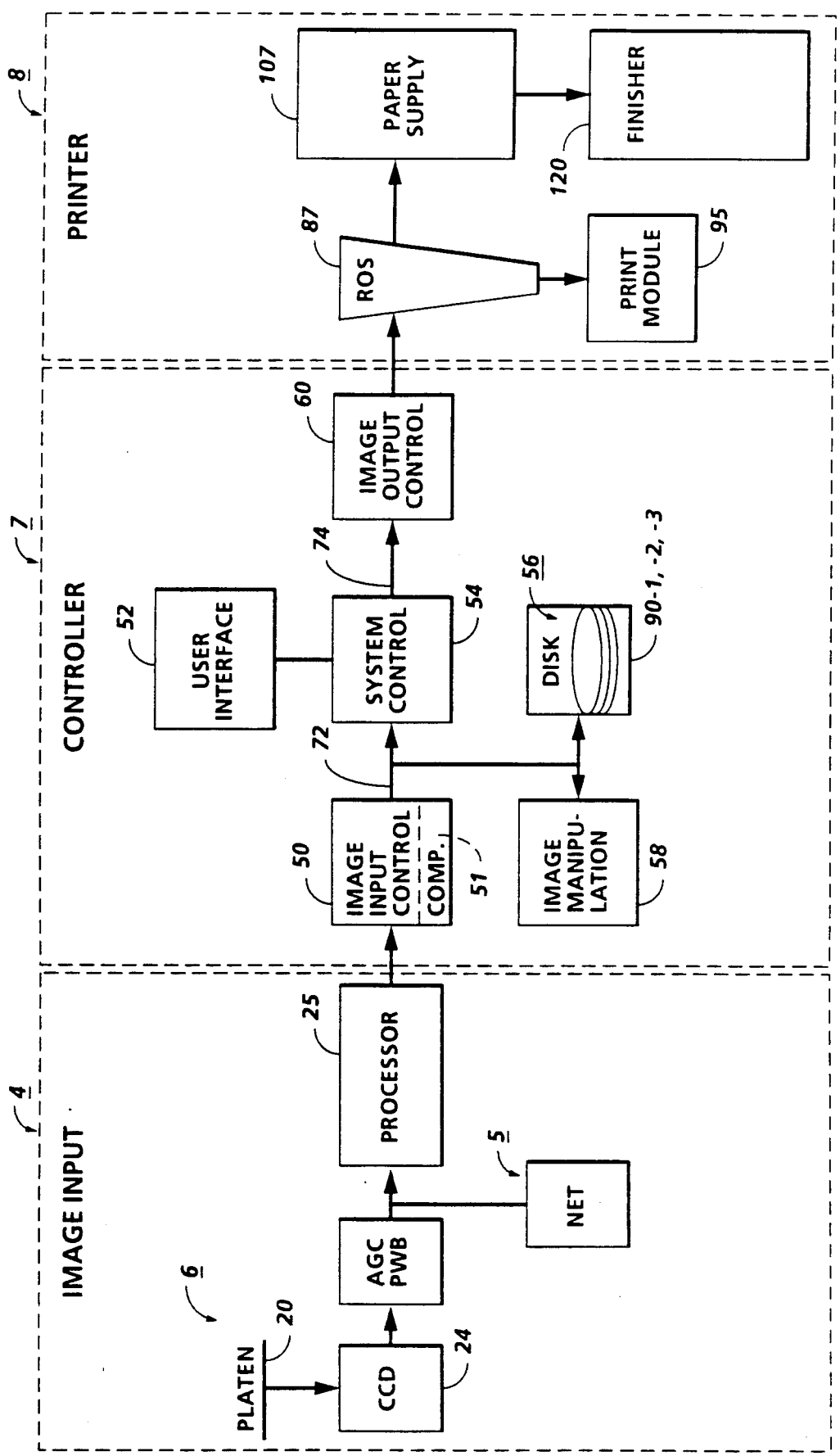
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling printing system 2 to provide network, scan, and print services. Other printing system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
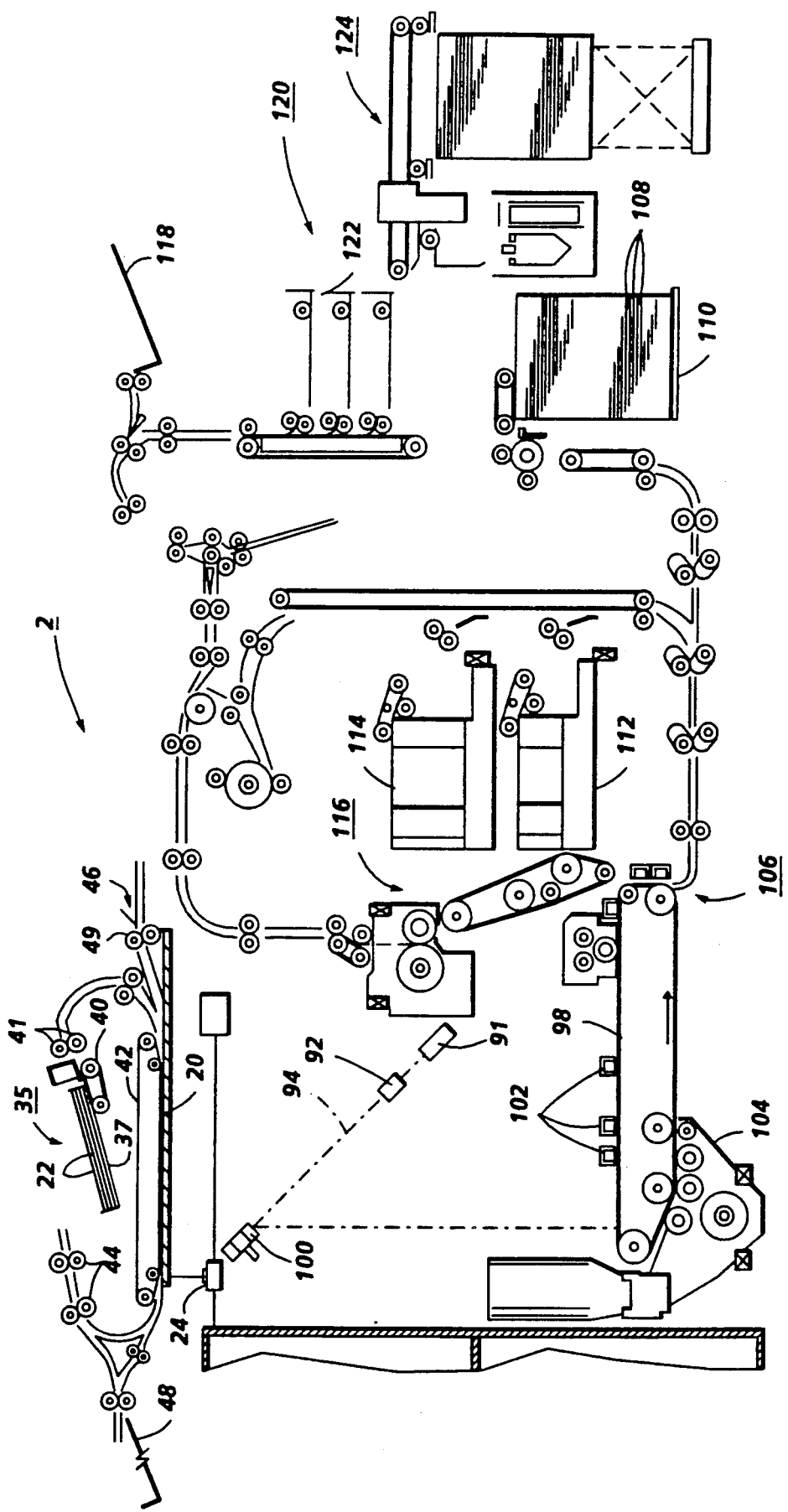
FIG. 3 is a plan view illustrating the principal mechanical components of the printing system shown in FIG. 1.
Figure 4:
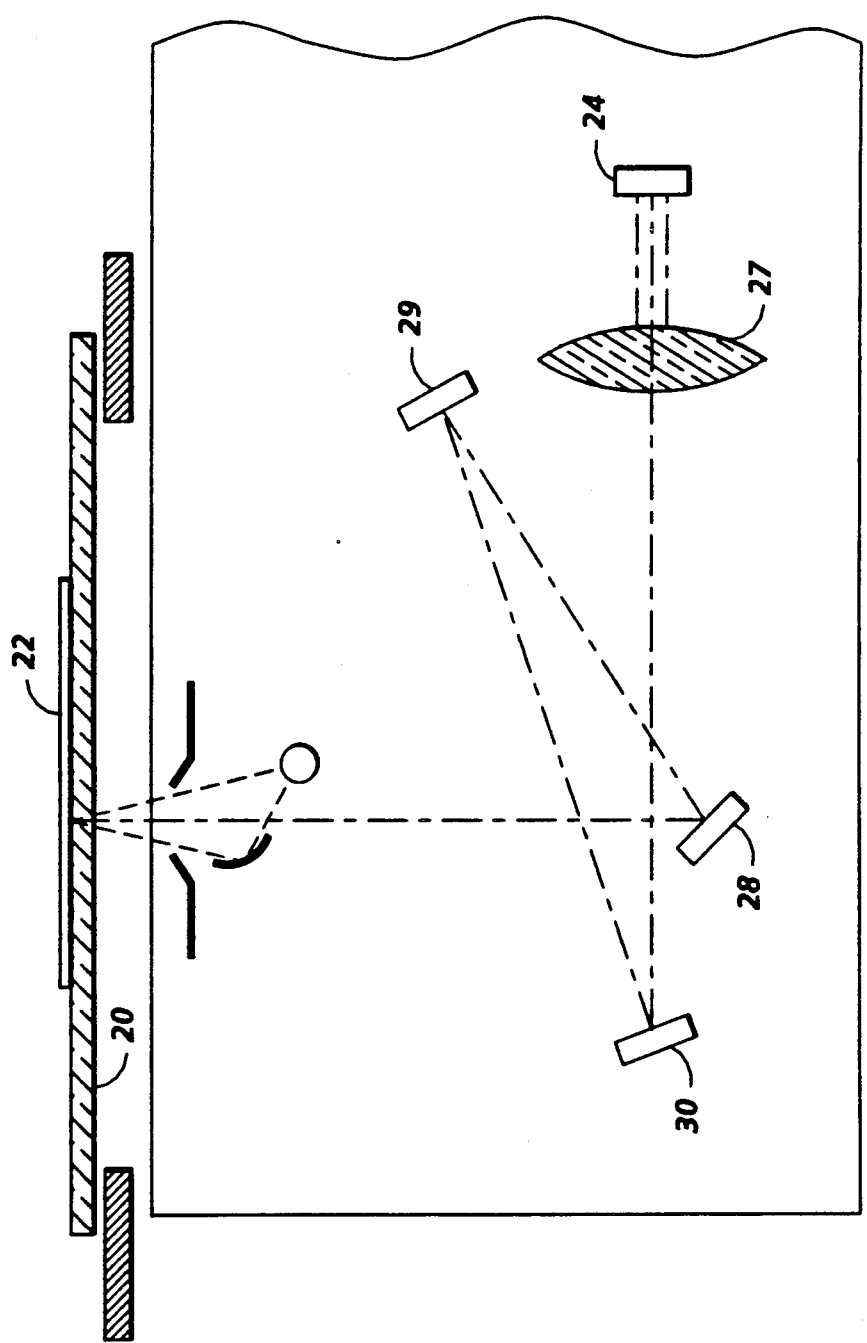
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to printing system 2 for processing. Where the Page Description Language (PDL) of the incoming imaging data is different than the PDL used by printing system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20 in the slow scan direction (depicted by the arrows 168, 168' in FIG. 8). Arrays 24 scan the document 22 on platen 20 line by line in the fast scan direction (depicted by arrow 167 in FIG. 8). Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable printing system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accomodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5A-5C, controller section 7 is, for explanation purposes, divided into an image input controller 50. User Interface (UI) 52, system controller 54, main memory 56, image manipulation section 58, and image output controller 60.

Image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/-processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within printing system 2.

Referring to FIG. 7, jobs are programmed in a "JOB PROGRAM" mode using touchscreen 62 and/or mouse 66. For this, there is displayed a selection of programming file cards 150 (i.e., "JOB:Standard", "PAGE LEVEL", etc). Each file card 150, when selected, displays one or more tabbed Job Scorecards 152 containing the various job programming selections available with the selected Scorecard, and a Job Ticket 154 for the job. The Scorecard selections are in the form of windows with icons while the Job Ticket 154 displays three scorecard selections (i.e., "Job Level", "Basic", and "Special"), each with programming selections. The Job Ticket also displays, under the programming selection headings, the current selections. Where no selection is made by the operator, a default selection is programmed and displayed on the Job Ticket. In the example shown in FIG. 7, the default selections are shown, i.e., the "JOB-Standard" file card 150, the Scorecard 152 for "Job Level" and Job Ticket 154 for "Account: DEFAULT".

Referring to FIGS. 8–10, as referred to herein, a signature document 160 is one page of a document 22 having two discrete images 161, 162 in side by side relation with one another thereon. Images 161, 162 may be one one side only of ducument 160 or on both sides. Signature document 160 may be an unbound document or may be a page from a bound document such as the book 163 depicted in FIGS. 9 and 10. The non-image area 165 between the images 161, 162 of each signature document 160, which is ordinarily necessary to prevent parts of the signature images from becoming obscured when the signature is folded, is referred to as a gutter. A signature foldline 164 is centered in gutter 165. The size, i.e. the width, of gutter 165 is determined by the inside margins 180-1 of the images 161, 162 on each side of foldline 164. Inside and outside margins 180-1 and 180-2, and side margins 180-3, and 180-4 define the image areas 161, 162 and gutter 165.

In the present invention, signature documents 160 are placed face down on platen 20 for scanning with the document oriented so that the images 161, 162 are opposite one another in the fast scan direction (the direction shown by arrow 167). Signature documents may be placed on platen 20 in this orientation while operating document handler 35 in any of the modes described previously. In the instance where book mode is used, book 163 is opened to the desired page and manually placed face down on platen 20 as shown in FIG. 10. To enable the signature document 160 to be located in proper position on platen 20 for scanning and insure that each image 161, 162 is completely scanned, the document is registered as for example by abutting the document edges against X and Y registration edges or guides 170, 172 provided along one side and one end respectively of the platen 20.

Referring particularly to FIG. 8, in order to capture the desired image areas 161, 162 on signature document 160 for later printing as a signature, programming of crop offset distances 177-1, 177-2, 177-3, 177-4 and crop distances 178-1, 178-2, 178-3 in both the fast and slow scan directions are ordinarily required. Crop offset refers to the space between the edge of the document and the margin of the image nearest thereto. As can be understood and as depicted in FIG. 8, crop offset distances 177-1, 177-2, 177-3, 177-4 may be provided for up to four sides of each image. Crop distances 178-1, 178-2, 178-3 define the size (i.e., length and width) of the image areas 161, 162 to be scanned and hence captured for printing. The crop distances 178-1, 178-2 in the fast scan direction are equal to one-half the document size minus the sum of the crop offsets for each individual image while the crop distance 178-3 in the slow scan direction is equal to the document size minus the sum of the crop offsets in the slow scan direction.

Pre-set or default crop offset and crop distance setting in both the fast and slow scan directions are provided. Where different crop offset and crop distances are desired, the new distances must be programmed in by the operator.

To accommodate folding of signatures along foldline 164 and prevent the fold from obscuring parts of the image areas, provision must also be made for gutter 165 when programming a signature job. Normally, signatures are folded and several signatures assembled together to form a book, pamphlet, or the like. In that case, the size of the gutter may require changing from signature to signature in accordance with the location of the signature as described in copending U.S. patent application Ser. No. 07/589,941, filed Sept. 28, 1990, to John L. Rourke et al, and entitled "Electronic Printing System for Printing Signatures", the disclosure of which is herein incorporated by reference. As will appear, the size of gutter 165 can also be changed from the default setting when changing the crop offset and crop distances.

Referring also to FIGS. 11 and 12, to program printing system 2 for scanning signature documents as part of a signature print job for example, the operator, using "Job types & Tickets" icon 149, accesses and displays a signature programming file card 150' with signature job ticket 154' displaying three signature scorecard selections (i.e., "Job Level," "Basic," and "Special") 150'. To program scanner 6 to isolate and scan one or both of the images 161, 162 on signature document 160, SPECIAL job scorecard 152' is selected. Crop icon 174 of SPECIAL scorecard 152' is actuated to display an imaginary document 160' with two images 161', 162' in work area 156 of touchscreen 62. Images 161', 162' are displayed one above the other with a gutter 165' displayed therebetween. An imaginary foldline 164' is also displayed in the center of gutter 165' together with default crop offset distances 177-1, 177-2, 177-3, 177-4 around the image margins. There is also displayed an electronic print 166 representative of the signature print that will be printed in the event printing is programmed.

Pairs of top and bottom scrolling icons 181, 182 and 184, 186 respectively are displayed on each side of the imaginary document 160' on screen 62 for use in setting crop offset and crop distances for each scanned image 161, 162 of signature document 160. A scale of numbers 188 is provided along one side of the imaginary document 160' to facilitate programming of the crop offsets and crop distances. A window 190 is displayed with each scrolling icon 181, 182, 184, 186 for displaying a numerical value of the crop offset currently programmed.

To set crop offset and crop distance in the slow scan direction (the direction depicted by arrow 168 in FIG. 8), left and right scrolling icons 192, 194 are provided below display document 160'. A scale 196 of numbers is depicted along the bottom of the display document to facilitate setting of the crop offset and crop distances. Each scrolling icon 192, 194 has a display window 198 associated with it for displaying the current selection made.

Where signature documents 160, either as separate pages or as pages in a book, pamphlet, or the like, are to be processed, the signature programming file card file "JOB: Signature" is selected for display on touchscreen 62. This displays a signature Job Ticket 154, and scorecard 152'depicting current or default signature programming selections including crop offsets and crop distances. Where the operator desires to change the current crop offset and crop distance settings, crop icon 174 of "Special" scorecard 152' is actuated to display an imaginary signature document 160' and imaginary signature print 166 picturing the current settings. Through selective actuation of scrolling icons 181, 182, 184, 186 and 192, 194, the operator can reprogram the crop offsets and crop distance settings to set new image margins 180-1, 180-2, 180-3, 180-4 and change the size of the images scanned in. Though selective adjust of the crop offsets, the size of gutter 165 may also be changed.

Following completion of programming for the signature job, signature documents 160 are input to platen 20 individually with the documents oriented such that the images 161, 162 are parallel to the fast scan direction. Where the signature documents are individual pages, this may be done by operating ADF 35 in a suitable one of the modes described heretofore. Where the signature documents 160 comprise the pages of a book 163, ADF 35 is operated in the book mode. The "Start Scan" button 162 (shown in FIG. 7) is actuated to initiate scanning, causing array 24 to move forward from the home position shown in FIG. 3 in the slow scan direction depicted by arrow 168 in FIG. 8. As a result of the aforedescribed programming, the portion of the lines of image signals output by array 24 in the slow scan direction between crop offsets 177-3 and 177-4 (i.e., crop distance 178-3) and in the fast scan direction between crop offset 177-1 and the inside margin 180-1 of image 161 (i.e., crop distance 178-1) are captured.

Array 24 is then reversed to scan in the slow scan direction depicted by arrow 168' in FIG. 8. During reverse scan, the portion of the lines of image signals output by array 24 in the slow scan direction between crop offsets 177-4 and 177-3 (i.e., crop distance 178-3) and in the fast scan direction between the inside margin 180-1 and crop offset 177-2 (i.e., crop distance 178-2) of image 162 are captured. The resulting image signals are stored in memory 56 pending use.

The foregoing process is repeated for each signature document until all of the documents have been scanned in.

While the invention has been described with reference to the structure disclosed, it is not confined to the details set forth, but is intended to cover such modifications or changes as may come within the scope of the following claims.

We claim:

1. A process for scanning signature documents in which each signature document has two discrete images separated by a gutter, with a scanner having a platen for supporting documents for scanning and at least one scanning array movable relative to the platen and the document thereon in the slow scan direction, the array scanning the document on the platen line by line in the fast scan direction to convert the images scanned to image signals, comprising the steps of:

a) positioning said signature document on said platen for scanning with said document oriented so that said two images are side by side one another in the fast scan direction to enable said array to view both said images concurrently on relative movement between said array and said platen in the slow scan direction;

b) setting the inside margins of said images in the fast scan direction to provide said gutter;

c) setting the outside margins of said images in the fast scan direction to establish in cooperation with said inside margins the size of said images in the fast scan direction;

d) actuating said scanner to move said array relative to said platen in one scan direction to scan the image area of said signature document delineated by one of said inside and outside margin pair whereby to provide image signals representative of one image;

reversing said scan direction to scan the area of said signature document delineated by the other of said inside and outside margin pair whereby to provide image signals representative of the other image.

2. The process according to claim 1 including the step of:

setting the side margins of said images in the slow scan direction so that scanning of said signature document in the slow scan direction is started and stopped to limit scanning to the image area between said side margins.

3. A process for scanning document sheets having first and second images on at least one side to provide corresponding first and second electronic pages for use by a printing system in printing signatures, said system having a scanner with scanning array and platen relatively movable with respect to one another in the slow scan direction with said array raster scanning sheets on said platen in the fast scan direction to convert the first and second images scanned to image signals, comprising the steps of:

a) programming said scanner to scan one or both of said first and second images on said sheets;

b) placing said sheets individually on said platen with said sheets oriented so that said first and second images are side by side one another in the fast scan direction;

c) locating said sheets so that said sheets are registered against one side and end of said platen for scanning;

d) establishing the width of said first and second images for scanning in the fast scan direction by:
 1) programming a crop offset distance between said one side of said platen and one margin of said first image;
 2) programming a crop distance between said margin and the opposite margin of said first image;
 3) programming a crop offset distance between one margin of said second image and said platen one side, and
 4) programming a crop distance for said second image equal to the crop distance programmed for said first image; and e) establishing the length of said first and second images for scanning in the slow scan direction by:
 1) programming a crop offset distance between said one end of said platen and the inside margin of said first and second images; and
 2) programming a crop distance between said inside margin and the outside margin of said first and second images.

4. The process according to claim 3 including the steps of:

a) actuating said scanner to establish relative movement between said array and said platen in said slow scan direction to cause said array to scan the image area of the sheet on said platen between the margins programmed for said first image whereby to provide said first electronic page; and b) reversing the direction of relative movement between said array and platen to cause said array to scan the area of said sheet between the margins programmed for said second image whereby to provide said second electronic page.

* * * * *